United States Patent [19]
Saito

[11] Patent Number: 6,011,633
[45] Date of Patent: *Jan. 4, 2000

[54] FACSIMILE APPARATUS

[75] Inventor: Hitoshi Saito, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/138,380

[22] Filed: Oct. 20, 1993

Related U.S. Application Data

[63] Continuation of application No. 07/782,730, Oct. 28, 1991, which is a continuation of application No. 07/544,379, Jun. 27, 1990.

[30] Foreign Application Priority Data

Jun. 30, 1989 [JP] Japan ..................... 1-167076

[51] Int. Cl.[7] ...................................... H04N 1/40
[52] U.S. Cl. .......................................... 358/449; 358/451
[58] Field of Search .................... 358/400, 406, 358/443, 447, 448, 449, 451, 528

[56] References Cited

U.S. PATENT DOCUMENTS

| | | | |
|---|---|---|---|
| 4,353,097 | 10/1982 | Takeda et al. | 358/287 |
| 4,423,439 | 12/1983 | Watanabe | 358/257 |
| 4,679,093 | 7/1987 | Yaguchi | 358/257 |
| 4,731,658 | 3/1988 | Koseki | 358/449 |
| 4,772,955 | 9/1988 | Kurahayashi et al. | 358/257 |
| 4,774,590 | 9/1988 | Haganuma et al. | 358/444 |
| 4,805,135 | 2/1989 | Ochi et al. | 364/900 |
| 4,885,641 | 12/1989 | Kato | 358/396 |
| 5,019,916 | 5/1991 | Ogura | 358/401 |
| 5,153,746 | 10/1992 | Satoh | 358/443 |

FOREIGN PATENT DOCUMENTS

| | | |
|---|---|---|
| 58-120368 | 7/1983 | Japan . |
| 61-242168 | 10/1986 | Japan . |
| 62-269553 | 11/1987 | Japan . |
| 63-211875 | 9/1988 | Japan . |
| 1-32764 | 2/1989 | Japan . |

*Primary Examiner*—Thomas D. Lee
*Attorney, Agent, or Firm*—Fitzpatrick, Cella, Harper & Scinto

[57] ABSTRACT

According to a facsimile apparatus of the present invention, the apparatus accepts image information, detects a predetermined amount of the input length of the input image information, sets the reduction ratio of the input image information on the basis of the detected input length and a predetermined fixed length, and outputs image information input in an output length on the basis of the set reduction ratio.

6 Claims, 4 Drawing Sheets

FACSIMILE APPARATUS

This application is a continuation of application Ser. No. 07/782,730 filed Oct. 28, 1991, which is a continuation of application Ser. No. 07/544,379 filed Jun. 27, 1990.

BACKGROUND OF THE INVENTION

1. Field of the Invention

The present invention relates to a facsimile apparatus, for example, a facsimile apparatus which records in a fixed length.

2. Description of the Related Art

An apparatus of this type has a function to add an origination in the upper end of a manuscript and, in many cases, it transmits an image exceeding a fixed length even in a case where a manuscript of a fixed length is transmitted. When a reading apparatus reads out an image, the image of a manuscript is sometimes extended as a result of the manuscript slipping and is read out. As regards the above-mentioned phenomenon, a technique to vary a reduction ratio according to the number of received lines is now available. However, the above-mentioned example of the prior art has a drawback in that since the facsimile has a plurality of resolutions, a judgment for an optimum reduction ratio cannot be made by only comparing the number of lines. The fact that an output image is exceedingly reduced in response to a received image, causes the deterioration of the image and leads to undesired results.

SUMMARY OF THE INVENTION

An object of the present invention is to solve the above-mentioned problems of the examples of the prior art.

Another object of the present invention is to provide a facsimile apparatus which is capable of eliminating drawbacks such as loss of information, the degradation of record quality caused by an unnecessary reduction, and difficulties in handling because of the division of an image.

A further object of the present invention is to provide a facsimile apparatus capable of outputting input images efficiently.

A still further object of the present invention is to provide a facsimile apparatus capable of reducing input images by the judgment of the operator and outputting the images.

A still further object of the present invention is to provide a facsimile apparatus capable of obtaining a high-quality output image even if an input image is reduced.

A still further object of the present invention is to provide a facsimile apparatus comprising an input means for inputting image information, a detection means for detecting a predetermined amount of the input length of image information inputted by the input means, a setting means for setting the reduction ratio of image information inputted by the input means on the basis of the inputted length detected by the detection means and a predetermined fixed length, an output means for outputting the image information inputted by the input means in an output length based on the reduction ratio which is set by the setting means.

A still further object of the present invention is to provide a facsimile apparatus comprising an image input means for inputting image information, a selection means for selecting whether image information inputted by the image input means is to be reduced or not, a detection means for detecting the predetermined amount of the input length of the image information inputted by the image input means, a judgment means for judging the presence or absence of the division output of the image information inputted by the image input means on the basis of the input length detected by the detection means and the predetermined fixed length, a division output means for dividing and outputting the image information inputted by the image input means in accordance with the fixed length when the judgment means has determined that division output was made, and a reduction output means for reducing and outputting the image information inputted by the image input means at any reduction ratio when the judgment means has judged that no division output was made and the selection means has selected the image information inputted by the image input means as that to be reduced.

A still further object of the present invention is to provide a facsimile apparatus comprising a reception means for receiving image information including the size information per page, a detection means for detecting an input length per page in the direction of subscanning on the basis of the image information received by the reception means, a first setting means for setting a fixed length in the direction of subscanning on the basis of the size information received by the reception means, a second setting means for setting the reduction ratio of the image information inputted by the reception means on the basis of the input length detected by the detection means and the fixed length set by the setting means, and an output means for outputting the image information received by the reception means in an output length on the basis of the reduction ratio set by the second setting means.

These and other objects, features and advantages of the present invention will become clear when reference is made to the following description of the preferred embodiments of the present invention, together with reference to the accompanying drawings.

DETAILED DESCRIPTION OF THE PREFERRED EMBODIMENTS

The preferred embodiments of the present invention will be explained in detail with reference to the accompanying drawings.

Figure 1:
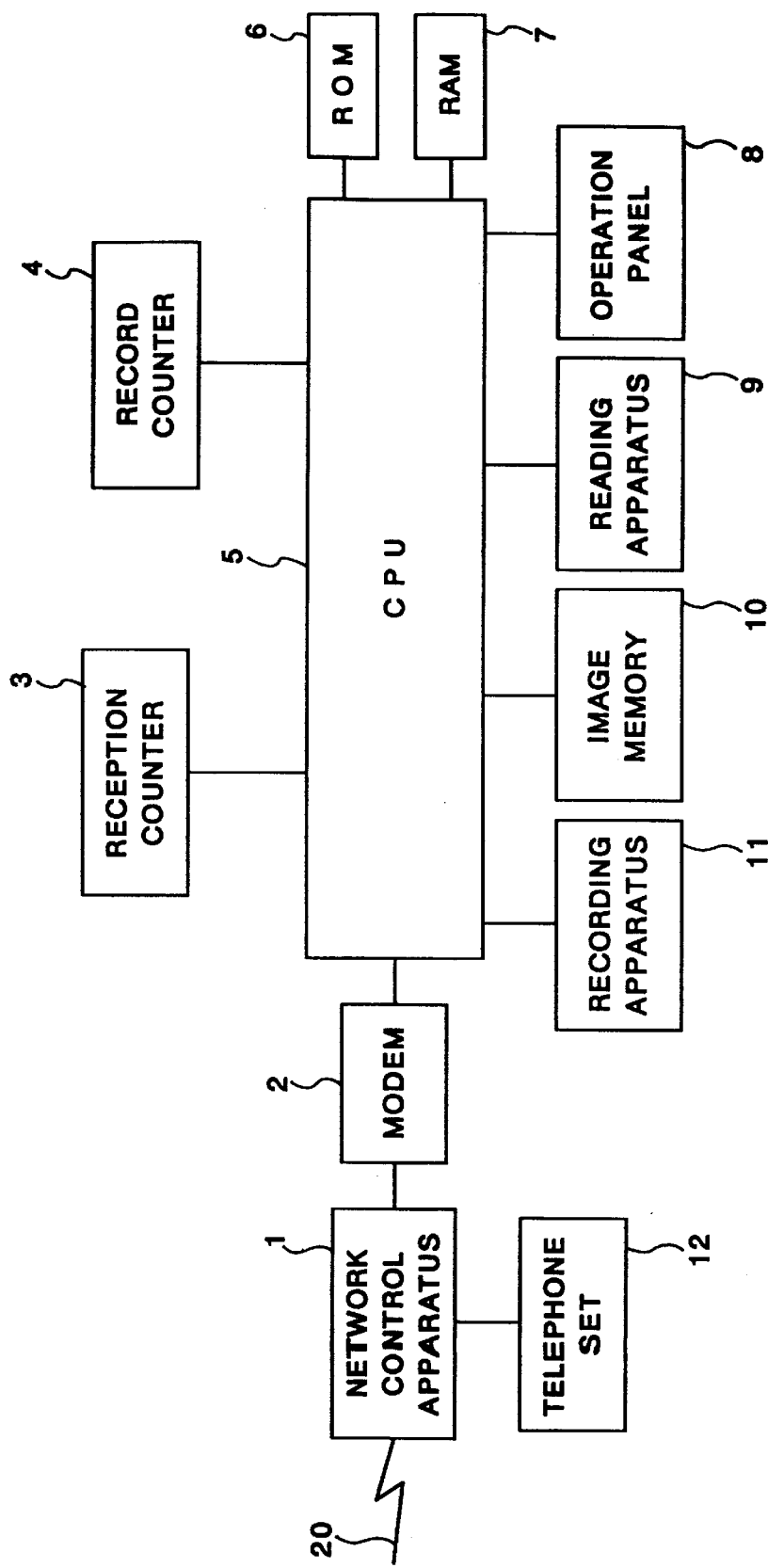
FIG. 1 is a block diagram illustrating the construction of a facsimile apparatus in one embodiment of the present invention.

FIG. 1 is a block diagram showing the construction of the facsimile apparatus in one embodiment of the present invention. Shown in the figure are a network control apparatus 1 for controlling a public line network, a modem 2 for modulating and demodulating digital and analog signals, a reception counter 3 for holding the number of lines of a received image, a record counter 4 for measuring the number of lines when recording is performed by a recording apparatus 11 to be described later, a CPU 5 for controlling all of this apparatus, a ROM 6 in which are stored control programs by which the CPU 5 is operated, programs in the flowcharts shown in FIGS. 2A and 2B and so forth, and a RAM 7 for use as a work area and a temporary save area at error processing time.

Also shown in FIG. 1 are an operation panel 8 having various kinds of operation keys such as a ten-key keyboard, a copy mode key and a liquid-crystal display screen for displaying the operational status, a reading apparatus 9 for reading out a manuscript, an image memory 10 for storing image information during reception or transmission time, a recording apparatus 11 for printing information on recording paper, a telephone set 12 for making a call, and a line 20 for transmitting data that connects the network control apparatus 1 with a public line network.

Next, the operation of this embodiment will be explained.

To perform a reception operation, the facsimile apparatus of this embodiment first accumulates a received image in the image memory 10 through ordinary image reception, and at the same time counts the number of lines of the received image (number of lines received), and stores this count value in the RAM 7. When an ordinary reception operation is terminated in this manner, the operation of recording received images is started next. In recording in accordance with the reduction ratio in the direction of subscanning to be described later, reduction processing is performed by thinning-out.

Figure 2A:
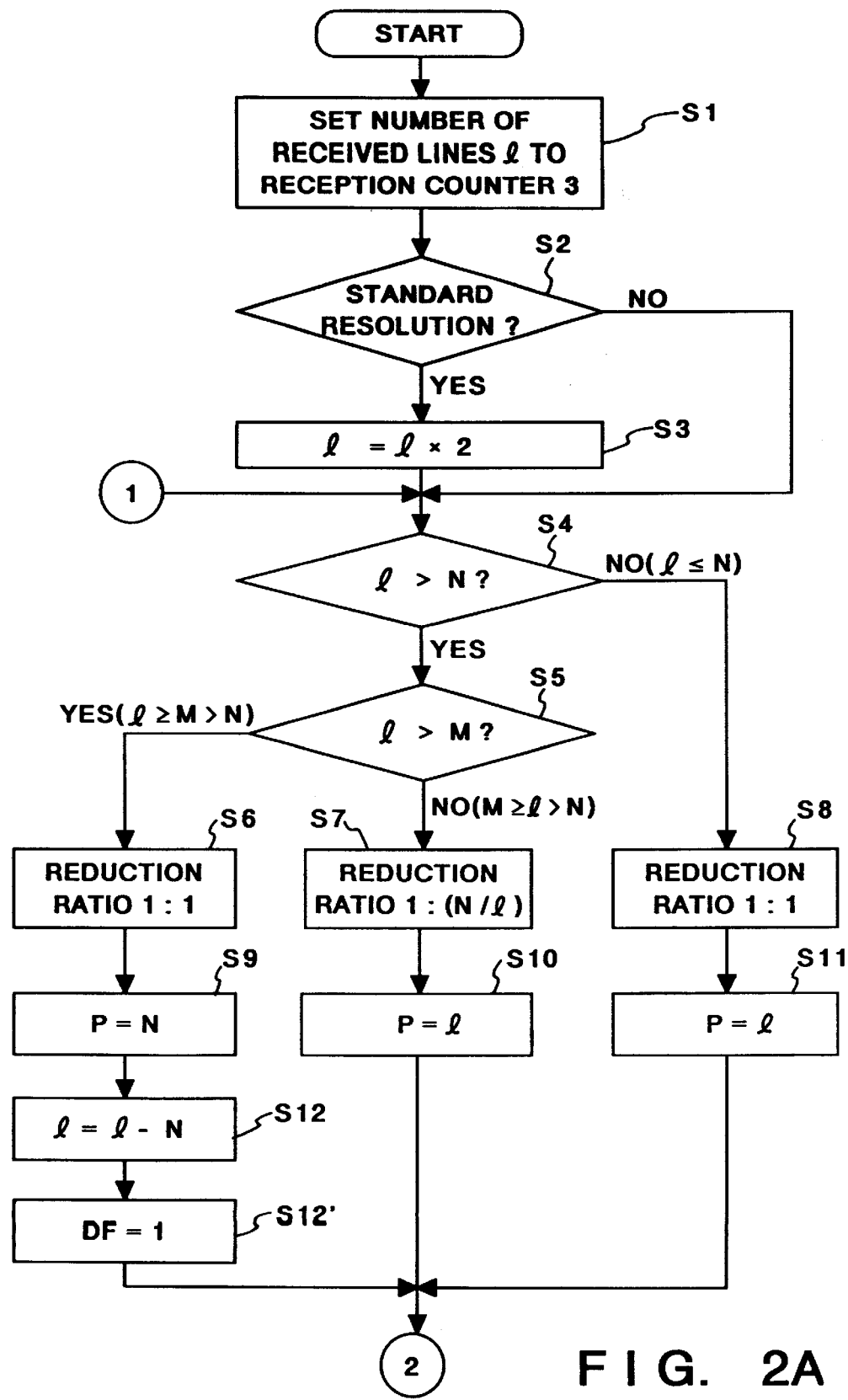
FIGS. 2A and 2B are flowcharts for explaining the operation of recording received images of this embodiment.
Figure 2B:
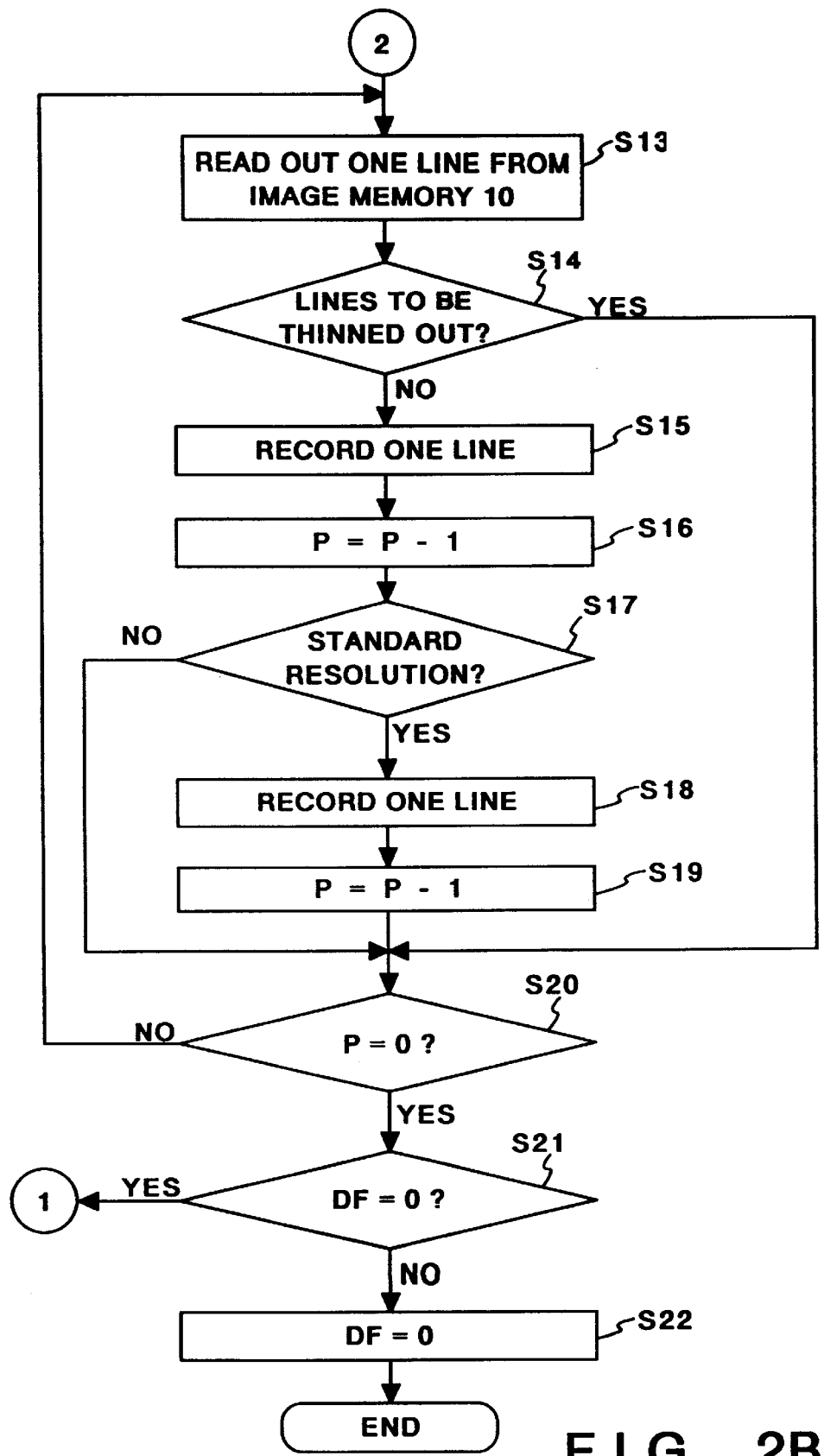
Figure 3C:
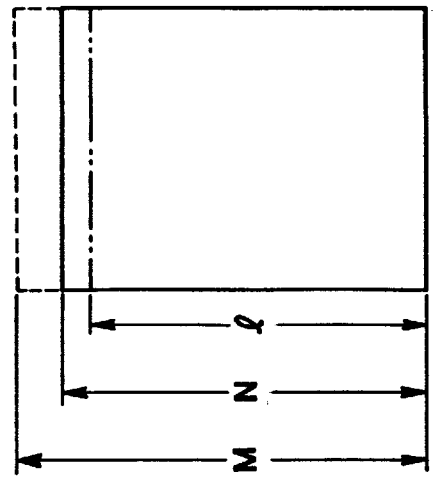
FIGS. 3A, 3B, and 3C are views for explaining the relation between the input length of a received image in the direction of subscanning and the output length of a recorded image in this embodiment.
Figure 3B:
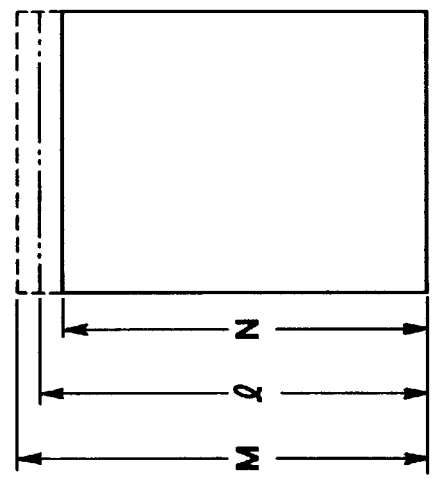
Figure 3A:
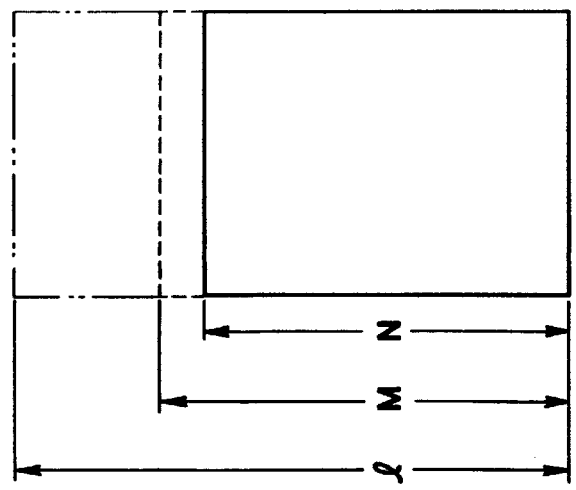

FIGS. 2A and 2B are flowcharts for explaining the operation of recording received images in this embodiment. FIGS. 3A, 3B, and 3C are views for explaining the relation between the input length of a received image in the direction of subscanning and the output length of a record image in this embodiment.

First, a count value (refers to the input length of a received image) stored in the RAM 7 is set in the reception counter 3 (step SI). The explanation will be given below with the count value denoted as 1. The resolution of the received image accumulated in the image memory 10 is checked. In the case of a standard resolution (not high resolution), since a two-times writing process is performed at recording, the value 1 of the reception counter 3, which is set in step S1, is set to a value two times the value 1 (steps S2 and S3).

Next, the value 1 of the reception counter 3 is compared with the preset number of lines (N) which recording paper of this apparatus can record per paper (step S4). The number of lines N indicates a fixed length. As a result, when the value 1 of the reception counter 3 is smaller than or equal to the number of lines, it is possible to record a received image and a record image with equal magnification. For this reason, the reduction ratio is 1, and the reduction ratio of the input length of the received image to the record image is set at 1:1 (step S8). An example is shown in FIG. 3C. The value 1 of the reception counter 3 is set in the record counter 4 (step S11) and the process proceeds to step S13. If the value of the record counter 4 is denoted as p, step S11 gives p=1. The value p of the record counter 4 indicates the output length of a record image.

If it is determined that the value of the reception counter 3 exceeds the number of lines N which can be recorded in step S4, the value 1 of the reception counter 3 is compared with a preset number of lines for division judgment (M:M= 1.1×N) (step S5). The number of lines M indicates a division judgment length. As a result, where the value 1 of the reception counter 3 is greater than the number of lines M, division recording is performed. An example thereof is shown in FIG. 3A. In this case, since recording is made in such a way that a image is divided into a plurality of images, the reduction ratio becomes 1:1 (equal magnification), and the reduction ratio of the input length of a received image to the output length of a record image is set at 1:1 (step S6). Further, the number of lines N is set in the record counter 4 and p is set at N (step S9). Next, the value 1 of the reception counter 3 is subtracted from the number of lines N and held for the purpose of recording the next page and those that follow (step S12). A division reading flag (DF) set in the RAM 7 is set to 1 and the process enters a state of division reading by the 1 of the flag DF. The process proceeds to step S13 (step S12').

In step S5, where it is determined that the value 1 of the reception counter 3 is below the number of lines M for division judgment, reduction recording is started. An example thereof is shown in FIG. 3B. In this case, the reduction ratio is set to a value in which the number of lines 1 is divided by the number of lines N, and the reduction ratio of the input length of the received image to the output length of the record image becomes 1: (N/1) (step S7). The value 1 of the reception counter 3 is set in the record counter 4 and the process proceeds to step S13 (step S10).

In this way, a printing operation to recording paper in steps S13 to S20 is started.

In step S13, a process of reading out image information one line by one line from the image memory 10 is performed. When one line of image information is read out (step S13), it is then determined whether or not read-out lines should be thinned out in accordance with the To sum up the processes of the above-mentioned embodiment, where the input length (number of received lines 1) is shorter than a fixed length (number of lines N) handled by this apparatus, recording at an equal magnification is performed. Where the input length is longer than the fixed length and shorter than the preset division judgment length (number of lines M), the input length is reduced using a value in which the input length is divided by the fixed length as the reduction ratio and is recorded. Where the input length is longer than the division judgment length, only the fixed length of it is recorded at an equal magnification and the remaining received images are recorded on the next page and those that follow.

As has been described above, according to the present invention, optimum and efficient recording of images can be effected in accordance with the input length of a received image.

In the above-mentioned embodiment, an example in which a basic, single recording paper size is used is cited. However, the present invention is not limited to this example. As a first modification, the present invention may be applied to a plurality of recording paper sizes. In this case, it may be arranged that the number of lines, which can be recorded in one page, corresponding to the type of a recording paper size, is set as a parameter and the type of the recording paper size is set by a facsimile apparatus at the reception side.

As a second modification, in the present invention the number of lines which can be recorded on one page may be switched automatically by the fact that the recording paper size of a image to be transmitted is entered from a terminal at the transmission side.

In the above-mentioned embodiment, whether or not the image to be reduced is determined automatically. The present invention is not limited to this example. As a third modification, the operator may select whether or not reduction should be made. In such a case, all received images may be reduced in advance, or when the process is judged to be one in which a received image should be reduced and output, the judgment may be entrusted to the operator at that point. Therefore, as a construction, a key for instructing that the reduction processing be performed on the received image should be provided on the operation panel 8 shown in FIG. 1.

In the above-mentioned embodiment, only a reduction in the direction of subscanning is performed by thinning out lines. The present invention is not limited to this example. As a fourth modification, recording with higher quality can be effected by making the recording density in above-mentioned reduction ratios in steps S6, S7, and S8 (step S14). Where the lines are judged to be lines not to be thinned out, one line of the read-out image information is transferred to the recording apparatus 11 and thus recording of one line is performed (step S15). The value p of the record counter 4 is decremented by 1 (step S16). If the received image has a standard resolution (step S17), the same image is recorded once more on the same line (step S18) and the value p of the record counter 4 is decremented again by 1 (step S19). As mentioned above, if a received image has a standard resolution, a process of writing an image two times is performed.

In the next step S20, the process is made to proceed to step S13 until the value p of the record counter 4 reaches "0" and processes from step S13 through step S19 are repeated. That is, a process of recording one page is repeated. When the recording of one page is terminated (step S20), a determination of whether or not the current recording process is executing division recording is made. In this case, when the value of the division record flag DF in the RAM 7 is 1, it is determined that division recording is in execution (step S21). As a result, if division recording is in execution, the process returns to step S4 where the recording of the remaining received image is performed. the direction of subscanning variable. Even in this case, a key for changing the recording density may be provided on the operation panel 8 so that the judgment is entrusted to the operator, or, when a received image is reduced and recorded, the recording density may be automatically set higher than the recording density of an equal magnification.

It is needless to say that the present invention is not limited to the example of a received image, as in the above-mentioned embodiment. As a fifth modification, the present invention may be applied to an ordinary copying function.

Of course, it goes without saying that a combination of two or more of the first to the fifth modifications may be made.

Many widely different embodiments of the present invention can be made without departing from the spirit and scope thereof, therefore it is to be understood that this invention is not limited to the specific embodiments thereof except as defined in the appended claims.

What is claimed is:

1. A facsimile apparatus, comprising:

receiving means for receiving one page of image data;

memory means for storing the image data received by said receiving means;

recording means for recording the image data on a cut sheet of a predetermined recording length;

control means for determining a received length of the image data, and comparing the received length with the predetermined recording length; and input means for manually inputting, by an operator of said facsimile apparatus, a reduced recording operation instruction, wherein said control means reduces the image data, and causes said recording means to record the reduced image data when the received length of the image data is longer than the predetermined recording length, and is shorter than a predetermined threshold length, said control means causes said recording means to record the image data without any reduction when the received length of the image data is not longer than the predetermined recording length, or is longer than the predetermined threshold length, and said control means accepts the reduced recording operation instruction input by the operator at a time when said control means has determined that the received length of the image data is longer than the predetermined recording length, and is shorter than the predetermined threshold length, and causes said recording means to record the reduced image data in accordance therewith.

2. The apparatus according to claim 1, wherein one page of the image data is comprised of a number of scan lines, and further comprising a line counter for counting the number of scan lines in one page of the image data.

3. The apparatus according to claim 2, wherein the received length for the one page is determined by said control means in terms of a counted number of scan lines.

4. A data reception and recording control method for a facsimile apparatus, comprising the steps of:

receiving one page of image data;

storing the image data received in said receiving step;

recording the image data on a cut sheet of a predetermined recording length; and determining a received length of the image data, and comparing the received length with the predetermined recording length, wherein said determining step further reduces the image data, and causes said recording step to record the reduced image data when the received length of the image data is longer than the predetermined recording length, and is shorter than a predetermined threshold length, said determining step causes said recording step to record the image data without any reduction when the received length of the image data is not longer than the predetermined recording length, or is longer than the predetermined threshold length, and said determining step accepts a reduced recording operation instruction manually input to the facsimile apparatus by an operator of the facsimile apparatus at a time when it is determined in said determining step that the received length of the image data is longer than the predetermined recording length, and is shorter than the predetermined threshold length, and causes said recording step to record the reduced image data in accordance therewith.

5. The method according to claim 4, wherein one page of the image data is comprised of a number of scan lines, and further comprising the step of counting the number of scan lines in one page of the image data.

6. The method according to claim 5, wherein the received length for the one page is determined in said determining step in terms of a counted number of scan lines.

* * * * *

UNITED STATES PATENT AND TRADEMARK OFFICE
CERTIFICATE OF CORRECTION

PATENT NO.   : 6,011,633
DATED          : January 4, 2000
INVENTOR(S) : Hitoshi Saito It is certified that error appears in the above-identified patent and that said Letters Patent is hereby corrected as shown below:

Column 3:
Line 31, "3 (step SI)." should read -- 3 (step S1). --.

Column 4:
Line 23, "the" should read -- the above-mentioned reduction ratios in steps S6, S7, and S8 (step S14). Where the lines are judged to be lines not to be thinned out, one line of the read-out image information is transferred to the recording apparatus 11 and thus recording of one line is performed (step S15). The value p of the record counter 4 is decremented by 1(step S16). If the received image has a standard resolution (step S17), the same image is recorded once more on the same line (step S18) and the value p of the record counter 4 is decremented again by 1 (step S19). As mentioned above, if a received image has a standard resolution, a process of writing an image two times is performed.

In the next step S20, the process is made to proceed to step S13 until the value p of the record counter 4 reaches "0" and processes from step S13 through step S19 are repeated. That is, a process of recording one page is repeated. When the recording of one page is terminated (step S20), a determination of whether or not the current recording process is executing division recording is made. In this case, when the value of the division record flag DF in the RAM 7 is 1, it is determined that division recording is in execution (step S21). As a result, if division recording is in execution, the process returns to step S4 where the recording of the remaining received image is performed. --; and Line 57, "image" should read -- image is --.

UNITED STATES PATENT AND TRADEMARK OFFICE
CERTIFICATE OF CORRECTION

PATENT NO. : 6,011,633
DATED : January 4, 2000
INVENTOR(S) : Hitoshi Saito

It is certified that error appears in the above-identified patent and that said Letters Patent is hereby corrected as shown below:

<u>Column 5:</u>
Line 5, "above" should be deleted;
Lines 6-28, lines 6 through 28 should be deleted; and
Line 29, "remaining received image is performed." should be deleted.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*